(12) United States Patent
Ooshima et al.

(10) Patent No.: US 12,591,141 B2
(45) Date of Patent: Mar. 31, 2026

(54) DISPLAY DEVICE

(71) Applicant: Magnolia White Corporation, Tokyo (JP)

(72) Inventors: Tetsuya Ooshima, Tokyo (JP); Shinichi Komura, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/735,326

(22) Filed: Jun. 6, 2024

(65) Prior Publication Data

US 2024/0418996 A1    Dec. 19, 2024

(30) Foreign Application Priority Data

Jun. 13, 2023    (JP) ................................. 2023-097097

(51) Int. Cl.
| | |
|---|---|
| *G02B 27/01* | (2006.01) |
| *G02B 5/30* | (2006.01) |
| *G02B 5/32* | (2006.01) |
| *G02F 1/1335* | (2006.01) |

(52) U.S. Cl.
CPC ....... *G02B 27/0172* (2013.01); *G02B 5/3083* (2013.01); *G02B 5/32* (2013.01); *G02F 1/133536* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 6,747,612 B1* | 6/2004 | Knox | ................. | G02B 27/0172 |
| | | | | 345/102 |
| 2020/0166764 A1* | 5/2020 | Lee | ........................ | G02B 30/00 |
| 2022/0113544 A1* | 4/2022 | Komura | ............... | G02B 5/3083 |

FOREIGN PATENT DOCUMENTS

| | | |
|---|---|---|
| JP | 2005-148655 A | 6/2005 |
| JP | 2009-157026 A | 7/2009 |
| JP | 2010-033026 A | 2/2010 |

* cited by examiner

*Primary Examiner* — Joseph R Haley
(74) *Attorney, Agent, or Firm* — K&L Gates LLP

(57)    ABSTRACT

According to one embodiment, a display device includes a display element including a display portion which displays an image, a first retardation film overlapping the display element, a holographic optical element adjacent to the display element and not overlapping the display portion, a second retardation film having a first surface which faces the first retardation film and the holographic optical element and which directly contacts neither a main surface of the first retardation film nor a main surface of the holographic optical element, and a second surface on an opposite side to the first surface, and a reflective polarizer disposed on the second surface.

10 Claims, 12 Drawing Sheets

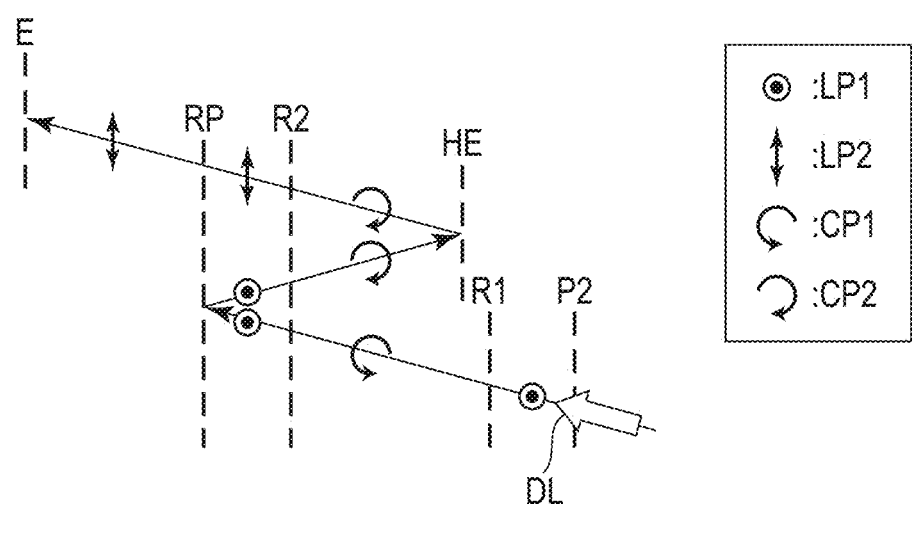
F I G. 4
F I G. 5

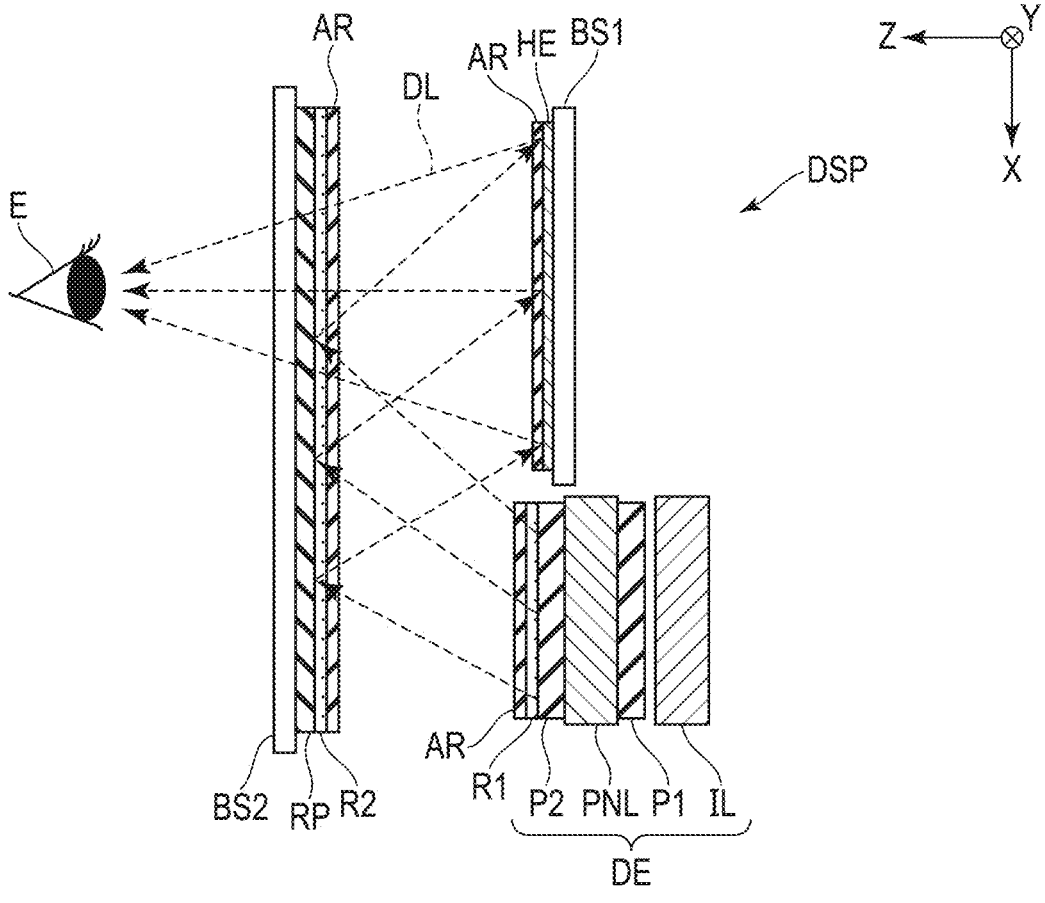
F I G. 7

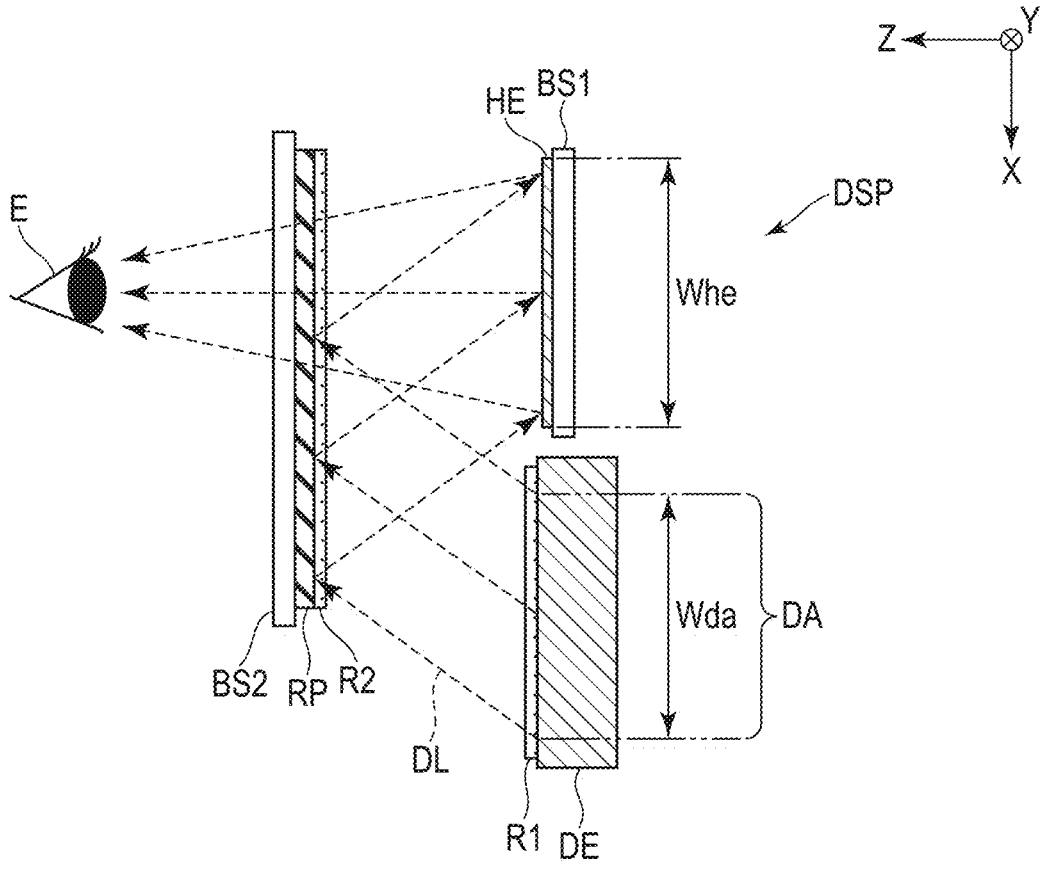
F I G . 8

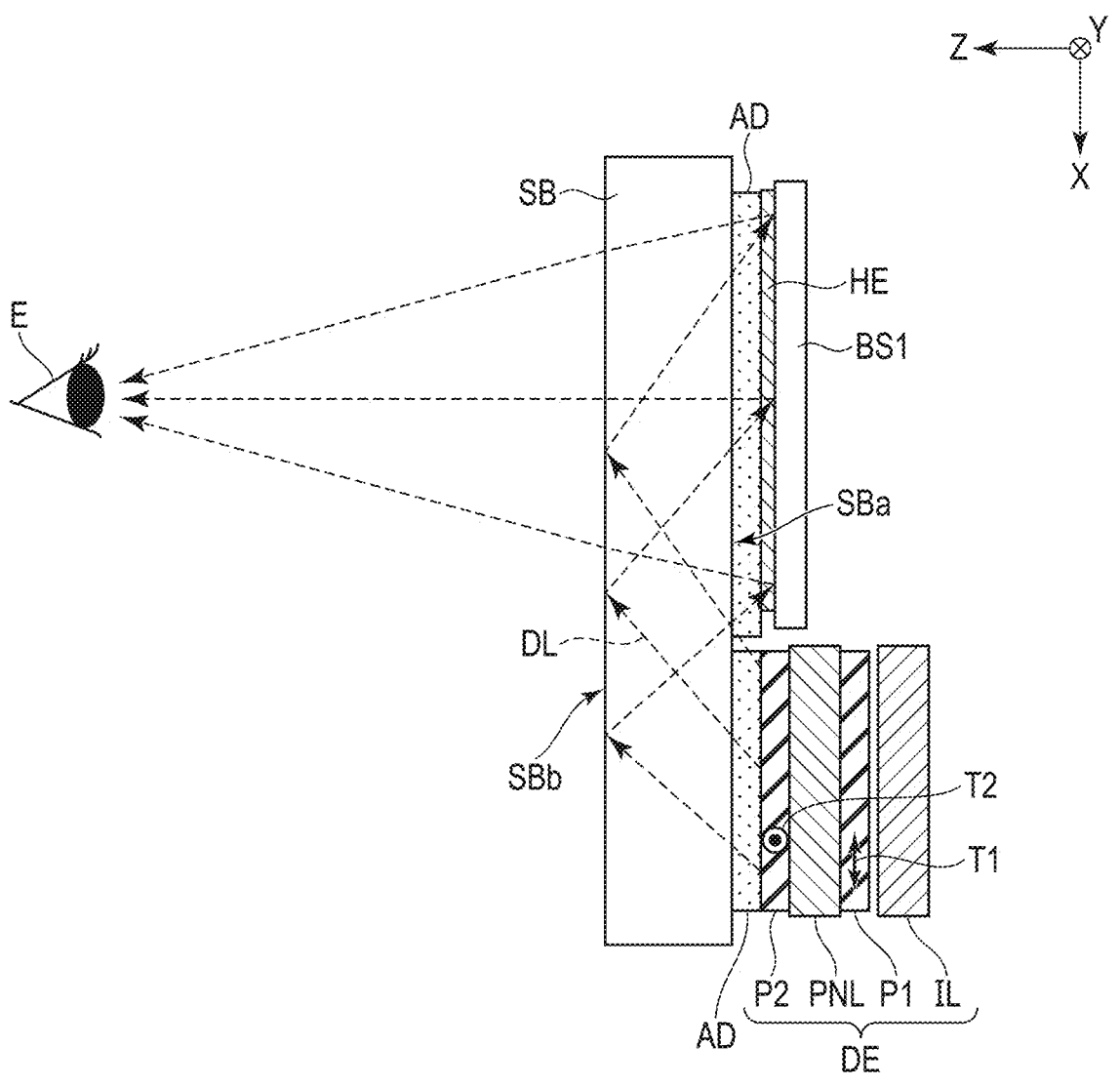
F I G. 10

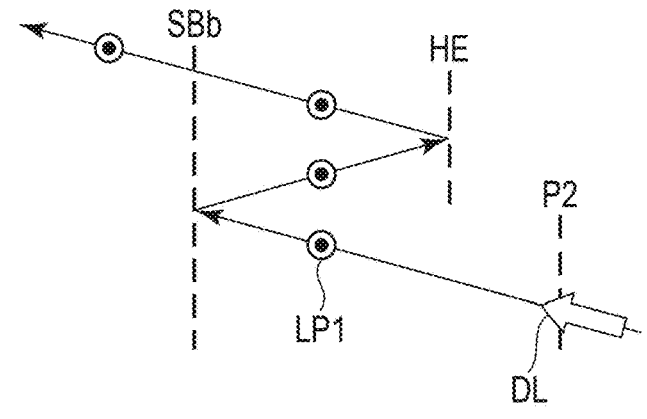
F I G. 12
F I G. 13

DISPLAY DEVICE

CROSS-REFERENCE TO RELATED APPLICATIONS

This application is based upon and claims the benefit of priority from Japanese Patent Application No. 2023-097097, filed Jun. 13, 2023, the entire contents of which are incorporated herein by reference.

FIELD

Embodiments described herein relate generally to a display device.

BACKGROUND

In recent years, a technique for providing, for example, virtual reality (VR), using a head-mounted display worn on a user's head has attracted attention. The head-mounted display is configured to display an image on a display provided in front of the user's eyes. This allows the user wearing the head-mounted display to experience a virtual reality space with a sense of reality.

A technique for guiding light from a display element to the user's eyes, using a holographic optical element, has been known as an example of a technique for realizing such a head-mounted display.

BRIEF DESCRIPTION OF THE DRAWINGS

FIG. 4 is a diagram for explaining the optical action of the display device DSP illustrated in FIG. 2.

FIG. 5 is a diagram illustrating another configuration example of the display device DSP illustrated in FIG. 1.

FIG. 7 is a diagram illustrating another configuration example of the display device DSP illustrated in FIG. 1.

FIG. 8 is a diagram illustrating another configuration example of the display device DSP illustrated in FIG. 1.

FIG. 10 is a diagram illustrating another configuration example of the display device DSP illustrated in FIG. 1.

FIG. 12 is a diagram for explaining the optical action of the display device DSP illustrated in FIG. 10.

FIG. 13 is a diagram illustrating another configuration example of the display device DSP illustrated in FIG. 1.

DETAILED DESCRIPTION

Figure 1:
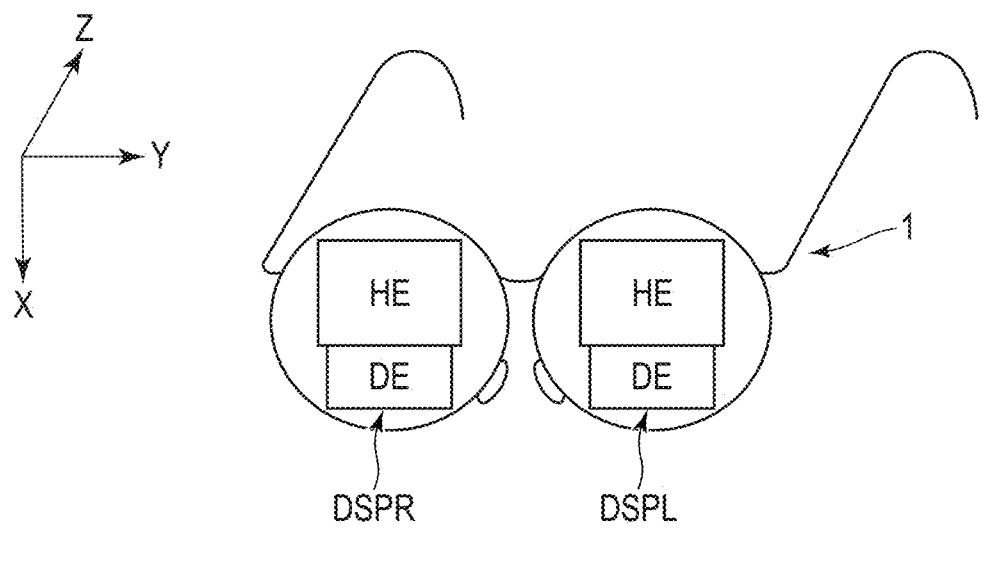
FIG. 1 is a perspective view illustrating an example of the outside of glasses 1 to which a display device DSP of a present embodiment is applied.

Embodiments described herein aim to provide a display device which can be downsized.

In general, according to one embodiment, a display device comprises a display element comprising a display portion which displays an image, a first retardation film overlapping the display element, a holographic optical element adjacent to the display element and not overlapping the display portion, a second retardation film having a first surface and a second surface on an opposite side to the first surface, the first surface facing the first retardation film and the holographic optical element and directly contacting neither a main surface of the first retardation film nor a main surface of the holographic optical element, and a reflective polarizer disposed on the second surface.

According to another embodiment, a display device comprises a display element comprising a display portion which displays an image, a holographic optical element adjacent to the display element and not overlapping the display portion, a transparent substrate having a first main surface and a second main surface on an opposite side to the first main surface, the first main surface facing the display element and the holographic optical element, and a transparent adhesive layer which adheres each of the display element and the holographic optical element to the first main surface.

According to the embodiments, a display device which can be downsized can be provided.

Embodiments will be described with reference to the accompanying drawings. Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as a first direction X. A direction parallel to the Y-axis is referred to as a second direction Y. A direction parallel to the Z-axis is referred to as a third direction Z. The X-axis, Y-axis and Z-axis may cross each other at an angle other than 90°. Further, a plane defined by the X-axis and the Y-axis is referred to as an X-Y plane, and viewing the X-Y plane is referred to as planar view.

FIG. 1 is a perspective view illustrating an example of the outside of glasses 1 to which a display device DSP of a present embodiment is applied.

The glasses 1 comprise, for example, a display device DSPR for a right eye and a display device DSPL for a left eye. The display devices DSPR and DSPL both comprise a display element DE and a holographic optical element HE. The display element DE and the holographic optical element HE are arranged in the first direction X. The display devices DSPR and DSPL are arranged in the second direction Y. Note that the display element DE and the holographic optical element HE may be arranged in the second direction Y or may be arranged in a direction different from the first direction X and the second direction Y.

The display devices DSPR and DSPL have substantially the same configuration and will be described hereinafter simply as the display device DSP.

Figure 2:
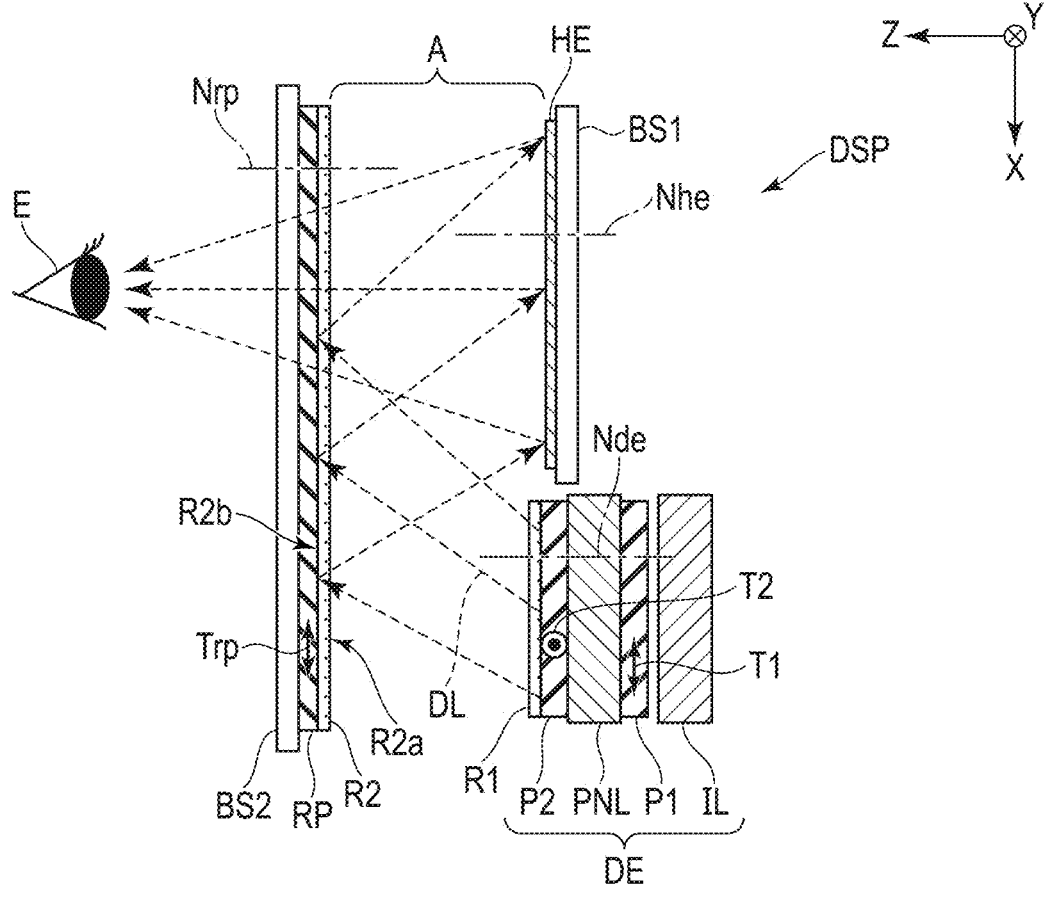
FIG. 2 is a diagram illustrating a configuration example of the display device DSP illustrated in FIG. 1.

FIG. 2 is a diagram illustrating a configuration example of the display device DSP illustrated in FIG. 1.

The display device DSP comprises the display element DE, a first retardation film R1, the holographic optical element HE, a second retardation film R2, and a reflective polarizer RP. The display element DE, the first retardation film R1, the holographic optical element HE, the second retardation film R2, and the reflective polarizer RP are all formed in the shape of a flat plate along the X-Y plane. A normal Nhe of the holographic optical element HE, a normal Nrp of the reflective polarizer RP, and a normal Nde of the display element DE are parallel to each other, and are all parallel to the third direction Z.

The display element DE comprises an illumination device IL, a liquid crystal panel PNL, a first polarizer P1, and a second polarizer P2. The first polarizer P1 is disposed between the illumination device IL and the liquid crystal panel PNL in the third direction Z. The liquid crystal panel PNL is disposed between the first polarizer P1 and the second polarizer P2 in the third direction Z. The transmission axis T1 of the first polarizer P1 and the transmission axis T2 of the second polarizer P2 are orthogonal to each other. For example, the transmission axis T1 is parallel to the first direction X and the transmission axis T2 is parallel to the second direction Y. The display element DE as described above is configured to emit display light DL of linearly polarized light from the second polarizer P2. The polarization axis of display light DL at the time of emission from the second polarizer P2 is parallel to the transmission axis T2. Display light DL at the time of emission from the second polarizer P2 is, for example, diverging light.

Note that the configuration of the display element DE is not limited to the example illustrated in the figure. For example, the display element DE may be a display panel comprising a self-luminous light-emitting element such as an organic electroluminescent (EL) element, a micro-LED, or a mini-LED. If the display element DE is a display panel comprising a light-emitting element, the illumination device and the first polarizer are omitted.

The first retardation film R1 overlaps the display element DE in the third direction Z. In the example illustrated in the figure, the first retardation film R1 overlaps the second polarizer P2. The first retardation film R1 as described above is a quarter-wave plate and gives a quarter-wave phase difference to light of a predetermined wavelength transmitted through it. The slow axis of the first retardation film R1 crosses the transmission axis T1 of the first polarizer P1 at an angle of approximately 45°, though not described in detail.

In the present specification, a state in which two members "overlap" is defined as a state in which part of one member exists on a normal of another member. In addition, the "overlap" state includes a state in which two members contact each other, a state in which two members adhere to each other, and a state in which a space or another member exists between two members.

The holographic optical element HE does not overlap the display element DE in the third direction Z, and is disposed to be adjacent to the display element DE in the first direction X. The holographic optical element HE is supported by a support body BS1. The holographic optical element HE is a resin film in which interference fringe patterns are recorded, diffracts incident light of a specific wavelength in a predetermined direction, and has the lens action of condensing incident light.

The second retardation film R2 is disposed to be opposed to the first retardation film R1 and the holographic optical element HE with an air layer A interposed therebetween in the third direction Z. The second retardation film R2 has a first surface R2a and a second surface R2b on the opposite side to the first surface R2a. The first surface R2a and the second surface R2b are opposed in the third direction Z. The first surface R2a corresponds to a surface facing the first retardation film R1 and the holographic optical element HE. The second retardation film R2 as described above is a quarter-wave plate and gives a quarter-wave phase difference to light of a predetermined wavelength transmitted through it. The slow axis of the second retardation film R2 crosses the transmission axis T2 of the second polarizer P2 at an angle of approximately 45° and is orthogonal to the slow axis of the first retardation film R1, though not described in detail.

The reflective polarizer RP is disposed on the second surface R2b of the second retardation film R2. Moreover, in the example illustrated in the figure, the stacked layer body of the reflective polarizer RP and the second retardation film R2 is supported by a transparent support body BS2. As the reflective polarizer RP, a multilayered thin-film type of polarizer, a wire-grid type of polarizer, or the like is applicable. The reflective polarizer RP as described above is configured to reflect first linearly polarized light and to transmit second linearly polarized light which is different from the first linearly polarized light. The transmission axis Trp of the reflective polarizer RP and the transmission axis T2 of the second polarizer P2 are orthogonal to each other. For example, the transmission axis Trp is parallel to the first direction X, the polarization axis of first linearly polarized light is orthogonal to the transmission axis Trp, and the polarization axis of second linearly polarized light is parallel to the transmission axis Trp.

The optical action in the display device DSP will be briefly described hereinafter.

Display light DL emitted from the display element DE is transmitted through the first retardation film R1, then transmitted through the second retardation film R2 via the air layer A, and reflected by the reflective polarizer RP, as indicated by broken lines. Display light DL reflected by the reflective polarizer RP is reflected by the holographic optical element HE via the air layer A. Display light DL reflected by the holographic optical element HE is transmitted through the second retardation film R2 via the air layer A again, then transmitted through the reflective polarizer RP, and condensed on the user's eye E under the lens action of the holographic optical element HE.

Figure 3:
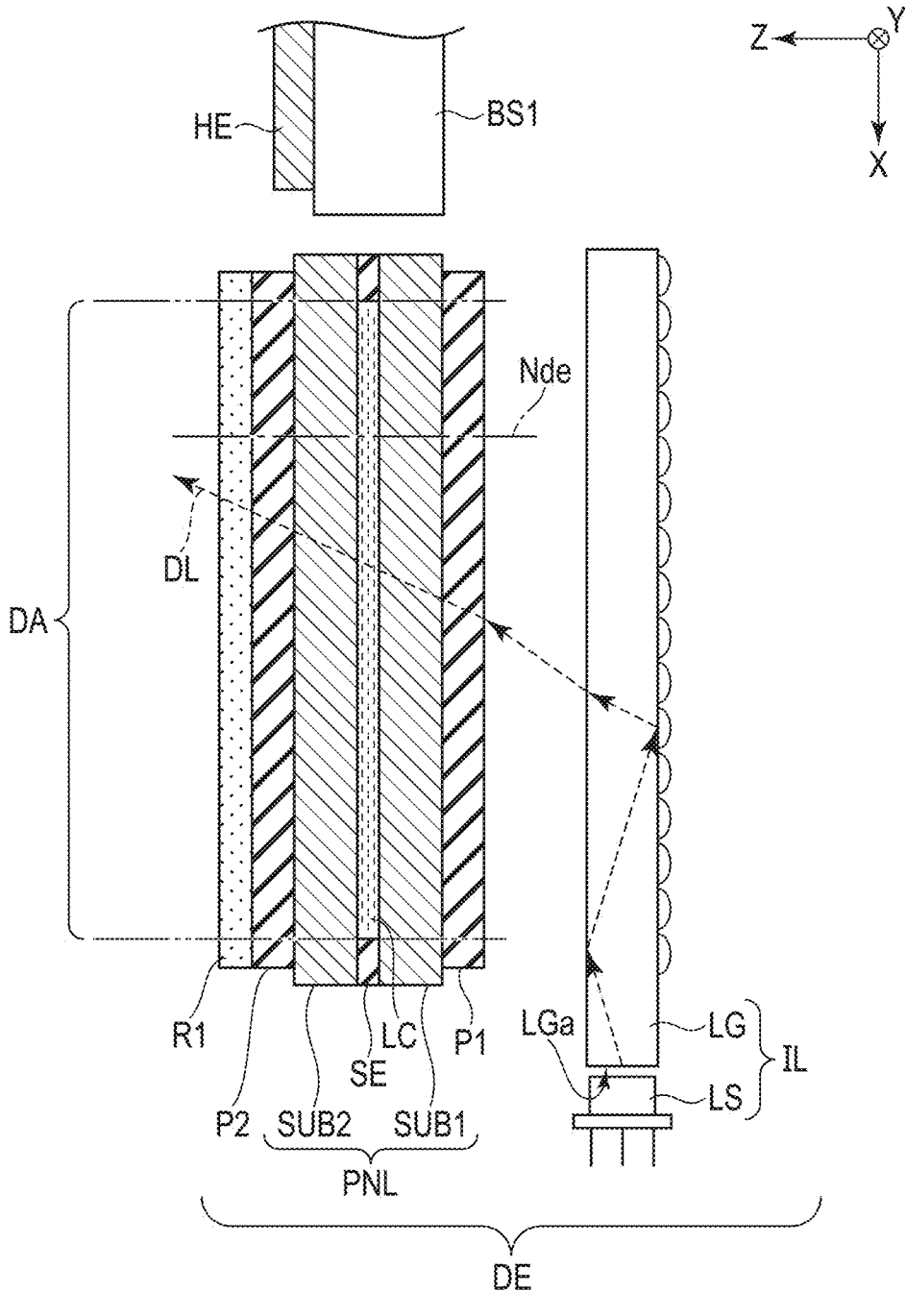
FIG. 3 is a diagram illustrating a configuration example of a display element DE applicable to the display device DSP illustrated in FIG. 2.

FIG. 3 is a diagram illustrating a configuration example of the display element DE applicable to the display device DSP illustrated in FIG. 2.

The liquid crystal panel PNL is a transmissive type, and comprises a first substrate SUB1, a second substrate SUB2, and a liquid crystal layer LC. The liquid crystal layer LC is held between the first substrate SUB1 and the second substrate SUB2 in the third direction Z, and is sealed by a sealant SE.

The liquid crystal panel PNL is disposed between the illumination device IL and the first retardation film R1 in the third direction Z. The first polarizer P1 is disposed between the illumination device IL and the liquid crystal panel PNL in the third direction Z and, for example, adheres to the first substrate SUB1. The second polarizer P2 is disposed between the liquid crystal panel PNL and the first retardation film R1 in the third direction Z and, for example, adheres to the second substrate SUB2.

A display portion DA is an area configured to display an image in the liquid crystal panel PNL. The normal Nde of the display element DE corresponds to, for example, a normal of the first substrate SUB1 or the second substrate SUB2.

The illumination device IL comprises a light guide LG and a light source LS. The light guide LG faces the first polarizer P1 in the third direction Z. The light source LS faces a side surface LGa of the light guide LG in the first direction X. The light source LS is disposed on the opposite side to the holographic optical element HE with the light guide LG interposed therebetween in the first direction X. The liquid crystal panel PNL is located between the light source LS and the holographic optical element HE in the first direction X.

The light source LS comprises a light-emitting element configured to emit light of a blue wavelength, a light-emitting element configured to emit light of a green wavelength, and a light-emitting element configured to emit light of a red wavelength, though not described in detail. As these light-emitting elements, laser elements are applied, for example.

Light emitted from the light source LS is propagated while being totally reflected inside the light guide LG. Light that fails to satisfy the conditions for total reflection, of the propagated light, is emitted from the light guide LG toward the liquid crystal panel PNL and forms illumination light. Illumination light incident on the liquid crystal panel PNL is inclined with respect to the normal Nde. The liquid crystal panel PNL selectively modulates illumination light in the display portion DA. Then, part of illumination light is transmitted through the second polarizer P2 and forms display light DL of linearly polarized light.

FIG. 4 is a diagram for explaining the optical action of the display device DSP illustrated in FIG. 2.

First, display light DL of first linearly polarized light LP1 transmitted through the second polarizer P2 of the display element DE is transmitted through the first retardation film R1 and converted into first circularly polarized light CP1. First circularly polarized light CP1 transmitted through the first retardation film R1 is transmitted through the second retardation film R2 and converted into first linearly polarized light LP1.

First linearly polarized light LP1 transmitted through the second retardation film R2 is reflected by the reflective polarizer RP. First linearly polarized light LP1 reflected by the reflective polarizer RP is transmitted through the second retardation film R2 and converted into second circularly polarized light CP2. Second circularly polarized light CP2 is light circularly polarized in the opposite direction to that of first circularly polarized light CP1.

Second circularly polarized light CP2 transmitted through the second retardation film R2 is reflected and diffracted by the holographic optical element HE. Second circularly polarized light CP2 reflected by the holographic optical element HE is transmitted through the second retardation film R2 and converted into second linearly polarized light LP2. Second linearly polarized light LP2 is linearly polarized light having a polarization axis orthogonal to first linearly polarized light LP1.

Second linearly polarized light LP2 transmitted through the second retardation film R2 is transmitted through the reflective polarizer RP, and condensed on the user's eye E under the lens action of the holographic optical element HE.

Note that first linearly polarized light LP1, which has been described with reference to FIG. 4, may be replaced by second linearly polarized light LP2, and first circularly polarized light CP1 may be replaced by second circularly polarized light CP2.

The above-described configuration example can reduce the thickness in the third direction z, as compared to that of an optical system comprising optical components formed of glass, resin, etc., and moreover, can achieve weight reduction. This enables the downsizing of the display device DSP.

In addition, the display element DE and the holographic optical element HE do not overlap in the third direction Z and are arranged in the first direction X. That is, the holographic optical element HE do not exist between the display element DE and the reflective polarizer RP in the third direction Z. Thus, in the optical path of display light DL from the display element DE to the reflective polarizer RP, display light DL is never reflected by the holographic optical element HE. Accordingly, assuming that substantially all of the reflected light from the reflective polarizer RP is reflected by the holographic optical element HE, substantially 100% of display light DL emitted from the display element DE can be condensed on the eye E, and the efficiency of light utilization can be improved.

FIG. 5 is a diagram illustrating another configuration example of the display device DSP illustrated in FIG. 1.

The configuration example illustrated in FIG. 5 is different from the configuration example illustrated in FIG. 2 in that a light blocking member LSM is disposed on the back surface side of the holographic optical element HE. In the example illustrated in the figure, the light blocking member LSM overlaps the support body BS1 in the third direction Z. The holographic optical element HE is located between second retardation film R2 and the light blocking member LSM in the third direction Z.

The light blocking member LSM may be a film adhering to the support body BS1 or may be a plate material attachable to and detachable from the glasses. In addition, the light blocking member LSM may be a liquid crystal element configured such that its transmittance for ambient light is changeable, or the like.

The glasses comprising the display device DSP of this configuration example can be used, for example, for the purpose of providing virtual reality.

Figure 6:
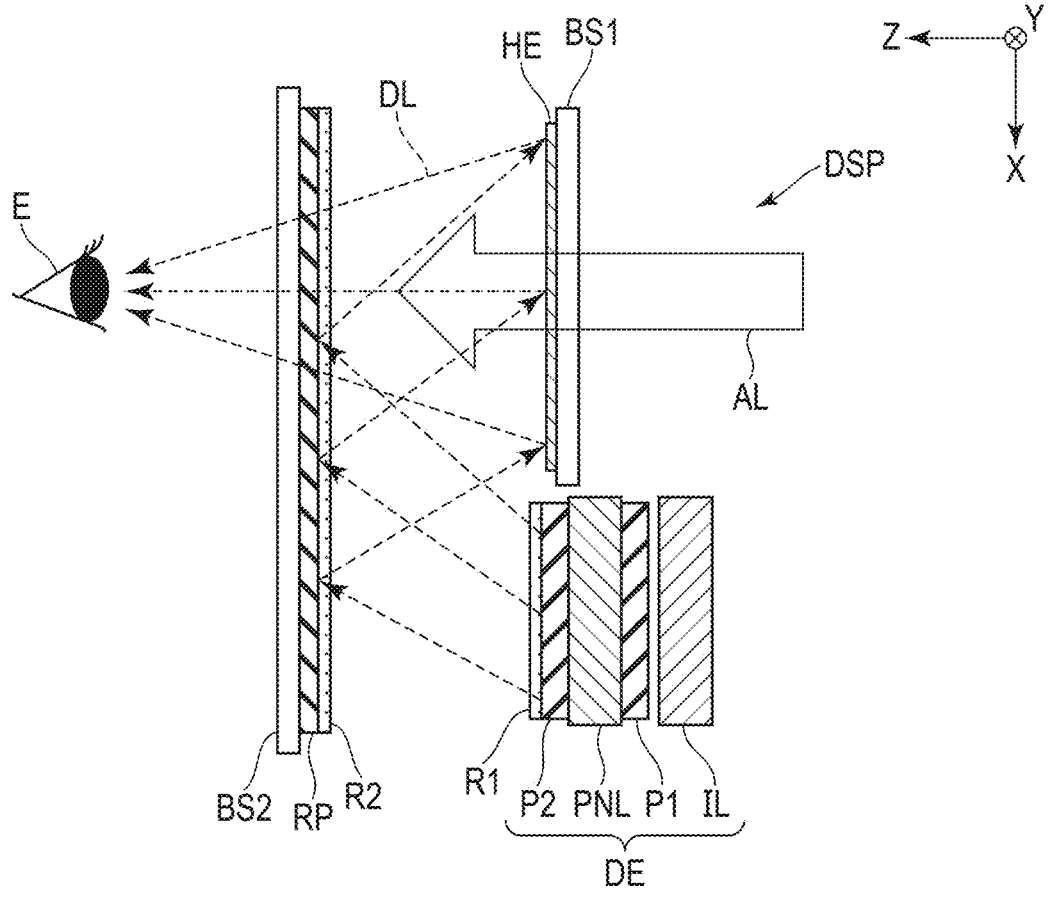
FIG. 6 is a diagram illustrating another configuration example of the display device DSP illustrated in FIG. 1.

FIG. 6 is a diagram illustrating another configuration example of the display device DSP illustrated in FIG. 1.

The configuration example illustrated in FIG. 6 is different from the configuration example illustrated in FIG. 2 in that the holographic optical element HE is configured to transmit ambient light AL. The user can visually recognize an image displayed by the display element DE while visually recognizing the surrounding environment of the display device DSP.

The glasses comprising the display device DSP of this configuration example can be used, for example, for the purpose of providing augmented reality.

FIG. 7 is a diagram illustrating another configuration example of the display device DSP illustrated in FIG. 1.

The configuration example illustrated in FIG. 7 is different from the configuration example illustrated in FIG. 2 in that the first retardation film R1, the second retardation film R2, and the holographic optical element HE are covered with anti-reflective layers AR, respectively.

If the anti-reflective layers AR do not exist, undesirable reflected light may be generated at the interface between the first retardation film R1 and the air layer, the interface between the second retardation film R2 and the air layer, and the interface between the holographic optical element HE and the air layer. Such undesirable reflected light may reach the user's eye E through an optical path different from a regular optical path of display light DL, and can be a cause for degradation in display quality.

According to the configuration example illustrated in FIG. 7, reflection is suppressed at the interface between the first retardation film R1 and the air layer, the interface between the second retardation film R2 and the air layer, and the interface between the holographic optical element HE and the air layer. Accordingly, degradation in display quality can be suppressed.

FIG. 8 is a diagram illustrating another configuration example of the display device DSP illustrated in FIG. 1.

The configuration example illustrated in FIG. 8 is different from the configuration example illustrated in FIG. 2 in that display light DL is parallel light. In this configuration example, the width Wda of the display portion DA is equal to the width Whe of the holographic optical element HE in the first direction, in which the display element DE and the holographic optical element HE are arranged.

If display light DL is diverging light, the width Whe needs to be set greater than the width Wda. In the configuration example illustrated in FIG. 8, the width Whe of the holographic optical element HE can be made small, as compared to that of the configuration example illustrated in FIG. 2, and the display device DSP can be further downsized. Moreover, since the angle of emission of display light DL is constant, optical design is easy.

As in the configuration example illustrated in FIG. 7, the anti-reflective layers AR may be applied, though not illustrated in the figure.

Figure 9:
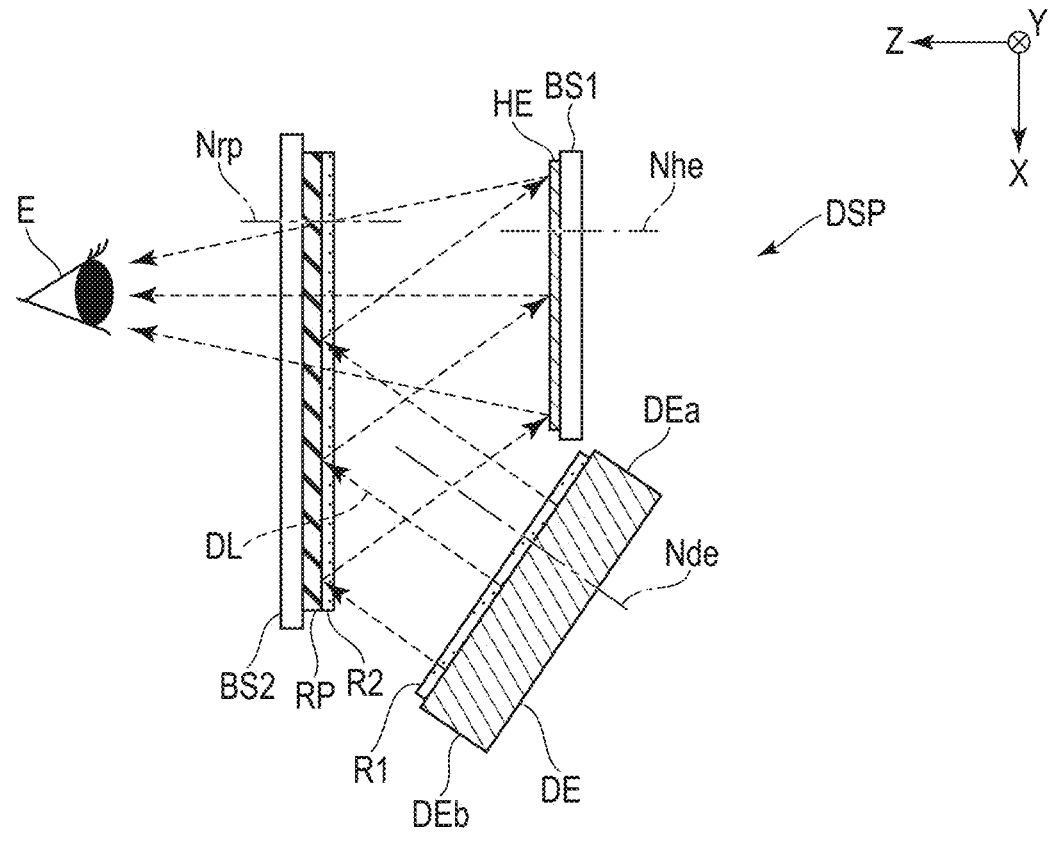
FIG. 9 is a diagram illustrating another configuration example of the display device DSP illustrated in FIG. 1.

FIG. 9 is a diagram illustrating another configuration example of the display device DSP illustrated in FIG. 1.

The configuration example illustrated in FIG. 9 is different from the configuration example illustrated in FIG. 2 in that the normal Nde of the display element DE is inclined with respect to the normal Nrp of the reflective polarizer RP. The display element DE has an end portion DEa close to the holographic optical element HE and an end portion DEb on the opposite side to the end portion DEa. The display element DE is inclined such that the end portion DEb is closer to the reflective polarizer RP than the end portion DEa. Note that the normal Nhe of the holographic optical element HE is parallel to the normal Nrp.

Display light DL emitted along the normal Nde of the display element DE may be diverging light or may be parallel light. Note that the display element DE is configured to display an image in consideration of distortion so that a regular image is condensed on the eye E.

According to this configuration example, the width in the first direction X can be reduced, and the display device DSP can be further downsized. Furthermore, the inclination of the angle of emission of display light DL is small, as compared to those of the configuration examples illustrated in FIG. 2, etc., so that optical design is easy and the existing illumination device IL for emitting display light in a frontal direction can be applied.

As in the configuration example illustrated in FIG. 7, the anti-reflective layers AR may be applied, though not illustrated in the figure.

FIG. 10 is a diagram illustrating another configuration example of the display device DSP illustrated in FIG. 1.

The display device DSP comprises the display element DE, the holographic optical element HE, a transparent substrate SB, and a transparent adhesive layer AD. The display element DE, the holographic optical element HE, and the transparent substrate SB are all formed in the shape of a flat plate along the X-Y plane.

As in the configuration example illustrated in FIG. 2, the display element DE comprises the illumination device IL, the liquid crystal panel PNL, the first polarizer P1, and the second polarizer P2. Note that if the display element DE is a display panel comprising a light-emitting element, the illumination device and the first polarizer are omitted.

The holographic optical element HE does not overlap the display element DE in the third direction Z, and is disposed to be adjacent to the display element DE in the first direction X. The holographic optical element HE is supported by the support body BS1. The holographic optical element HE diffracts incident light of a specific wavelength in a predetermined direction, and has the lens action of condensing incident light.

The transparent substrate SB is disposed to be opposed to the display element DE and the holographic optical element HE in the third direction Z. The liquid crystal panel PNL is disposed between the illumination device IL and the transparent substrate SB in the third direction Z.

The transparent substrate SB has a first main surface SBa and a second main surface SBb on the opposite side to the first main surface SBa. The first main surface SBa and the second main surface SBb are opposed in the third direction Z. The first main surface SBa corresponds to a surface facing the display element DE and the holographic optical element HE. The second main surface SBb contacts a low-refractive-index layer having a refractive index lower than that of the transparent substrate SB. In the example illustrated in the figure, the low-refractive-index layer is air. The transparent substrate SB as described above is a glass substrate or a resin substrate.

The transparent adhesive layer AD adheres each of the display element DE and the holographic optical element HE to the first main surface SBa. From the viewpoint of suppression of undesirable reflective interface generation, it is preferable that the refractive index of the transparent adhesive layer AD be equal to that of the transparent substrate SB.

The optical action in the display device DSP will be briefly described hereinafter.

Display light DL emitted from the display element DE is transmitted through the transparent adhesive layer AD and then incident on the transparent substrate SB as indicated by broken lines. Display light DL incident on the transparent substrate SB is totally reflected by the second main surface SBb. In other words, the display element DE is configured to emit display light DL at an angle which causes total reflection at the second main surface SBb. Display light DL reflected by the transparent substrate SB is transmitted through the transparent adhesive layer AD and then reflected by the holographic optical element HE. Display light DL reflected by the holographic optical element HE is transmitted through the transparent adhesive layer AD again, transmitted through the transparent substrate SB, and condensed on the user's eye E under the lens action of the holographic optical element HE.

Figure 11:
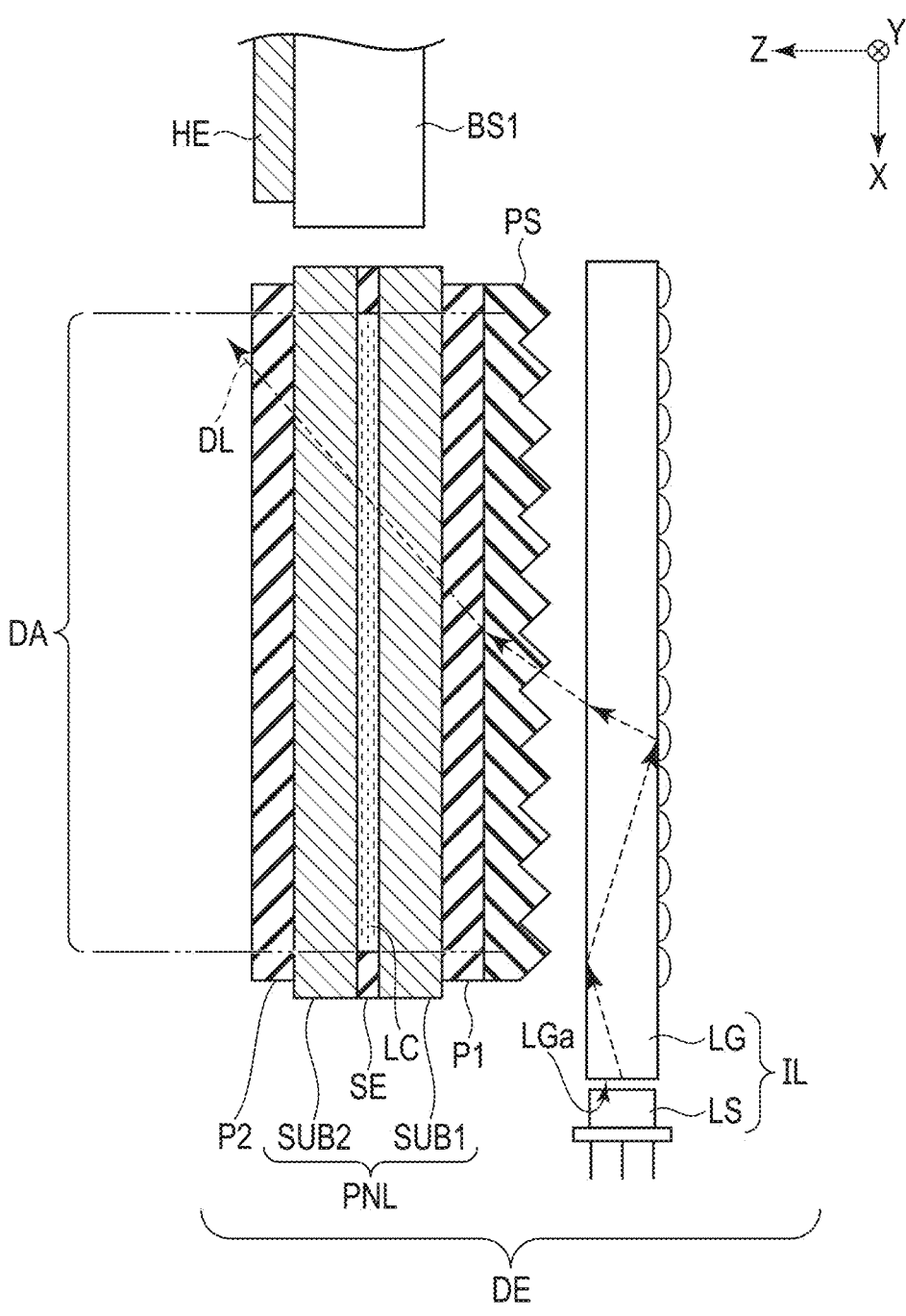
FIG. 11 is a diagram illustrating a configuration example of the display element DE applicable to the display device DSP illustrated in FIG. 10.

FIG. 11 is a diagram illustrating a configuration example of the display element DE applicable to the display device DSP illustrated in FIG. 10.

The display element DE comprises the liquid crystal panel PNL, the illumination device IL, a prism sheet PS. The prism sheet PS is disposed between the liquid crystal panel PNL and the illumination device IL in the third direction Z.

As in the configuration example illustrated in FIG. 3, the liquid crystal panel PNL is a transmissive type and comprises the first substrate SUB1, the second substrate SUB2, and the liquid crystal layer LC.

The illumination device IL comprises the light guide LG and the light source LS. The light guide LG faces the prism sheet PS in the third direction Z. The light source LS faces the side surface LGa of the light guide LG in the first direction X. The light source LS is disposed on the opposite side to the holographic optical element HE with the light guide LG interposed therebetween in the first direction X. The liquid crystal panel PNL is located between the light source LS and the holographic optical element HE in the first direction X.

Light emitted from the light source LS is propagated while being totally reflected inside the light guide LG. Light that fails to satisfy the conditions for total reflection, of the propagated light, is emitted from the light guide LG toward the liquid crystal panel PNL and forms illumination light. Illumination light is refracted at such an angle which causes totally reflection at the second main surface SBb as described above, when being transmitted through the prism sheet PS. Illumination light transmitted through the prism sheet PS is incident on the liquid crystal panel PNL. The liquid crystal panel PNL selectively modulates illumination light in the display portion DA. Then, part of illumination light is transmitted through the second polarizer P2 and forms display light DL of linearly polarized light.

FIG. 12 is a diagram for explaining the optical action of the display device DSP illustrated in FIG. 10.

First, display light DL of first linearly polarized light LP1 transmitted through the second polarizer P2 of the display element DE is incident on the transparent substrate SB and is totally reflected by the second main surface SBb. Display light DL totally reflected by the second main surface SBb is reflected and diffracted by the holographic optical element HE. Display light DL reflected by the holographic optical element HE is transmitted through the transparent substrate SB and condensed on the user's eye E under the lens action of the holographic optical element HE.

Note that first linearly polarized light LP1, which has been described with reference to FIG. 12, may be replaced by second linearly polarized light LP2. In addition, display light DL after being transmitted through the second polarizer P2 need not maintain a linearly polarized state.

According to this configuration example, the same advantages as those of the configuration example illustrated in FIG. 2 are achieved.

In addition, optical components such as a retardation film and a reflective polarizer are unnecessary, and weight reduction and cost reduction can be achieved.

Moreover, the thickness in the third direction Z can be further reduced, as compared to that of the configuration example illustrated in FIG. 2.

Furthermore, since the interface between the display element DE and the air layer and the interface between the holographic optical element HE and the air layer do not exist, undesirable reflection on the optical path of display light DL can be suppressed.

FIG. 13 is a diagram illustrating another configuration example of the display device DSP illustrated in FIG. 1.

The configuration example illustrated in FIG. 13 is different from the configuration example illustrated in FIG. 10 in that the light blocking member LSM is disposed on the back surface side of the holographic optical element HE.

The configuration of the light blocking member LSM is the same as that of the configuration example described with reference to FIG. 5.

The glasses comprising the display device DSP of this configuration example can be used, for example, for the purpose of providing virtual reality.

Figure 14:
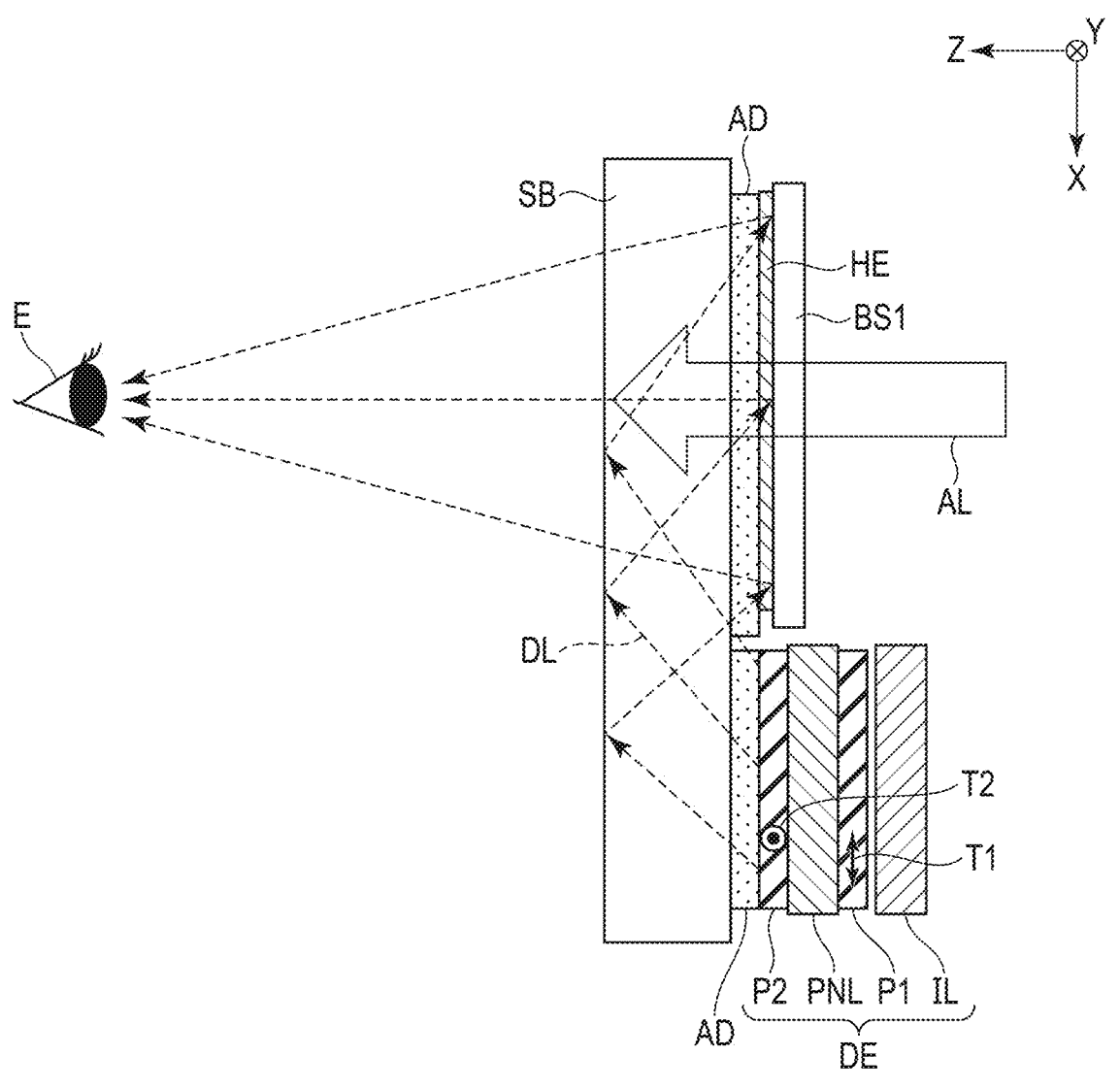
FIG. 14 is a diagram illustrating another configuration example of the display device DSP illustrated in FIG. 1.

FIG. 14 is a diagram illustrating another configuration example of the display device DSP illustrated in FIG. 1.

The configuration example illustrated in FIG. 14 is different from the configuration example illustrated in FIG. 10 in that the holographic optical element HE is configured to transmit ambient light AL. The user can visually recognize an image displayed by the display element DE while visually recognizing the surrounding environment of the display device DSP.

The glasses comprising the display device DSP of this configuration example can be used, for example, for the purpose of providing augmented reality.

A manufacturing method of the holographic optical element HE will be briefly described hereinafter.

Figure 15:
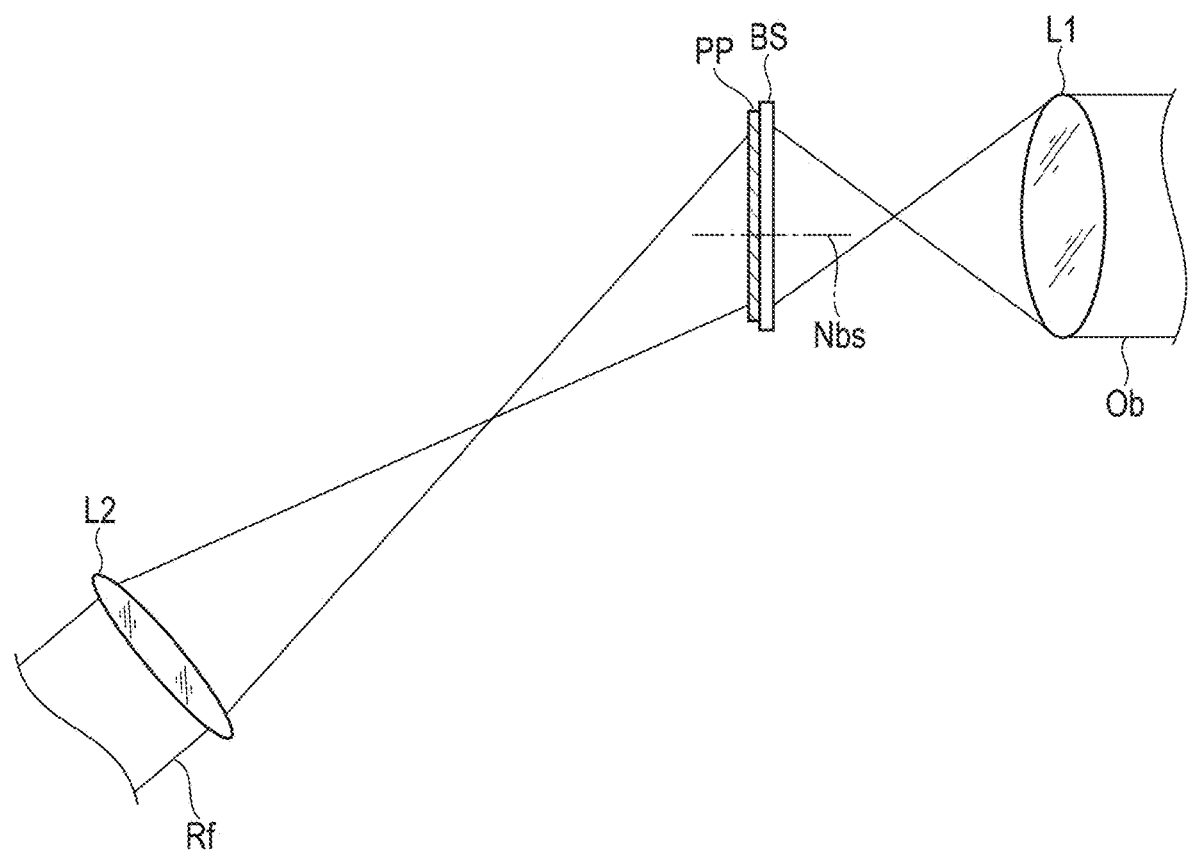
FIG. 15 is a diagram for explaining an example of a manufacturing method of a holographic optical element HE.

FIG. 15 is a diagram for explaining an example of the manufacturing method of the holographic optical element HE.

A photosensitive resin PP is formed on one surface of a transparent support body BS. The support body BS here may be the same as the support body BS1 illustrated in FIG. 2, etc., or may be different from the support body BS1.

Object light Ob is parallel light and is radiated toward the photosensitive resin PP via a lens L1. At this time, object light Ob is radiated in a direction along a normal Nbs of the support body BS.

Reference light Rf is parallel light and is radiated toward the photosensitive resin PP via a lens L2. At this time, reference light Rf is radiated in a direction inclined with respect to the normal Nbs of the support body BS. Reference light Rf and object light Ob are light of the same wavelength and interfere at the position of the photosensitive resin PP.

Interference fringes of reference light Rf and object light Ob are recorded in the photosensitive resin PP. In this way, the holographic optical element HE having a lens action equivalent to that of a concave mirror for incident light (diverging light) in a direction inclined with respect to the normal Nbs is manufactured. The holographic optical element HE thus manufactured is applicable as, for example, the holographic optical element HE of the display device DSP illustrated in FIG. 2, etc.

Figure 16:
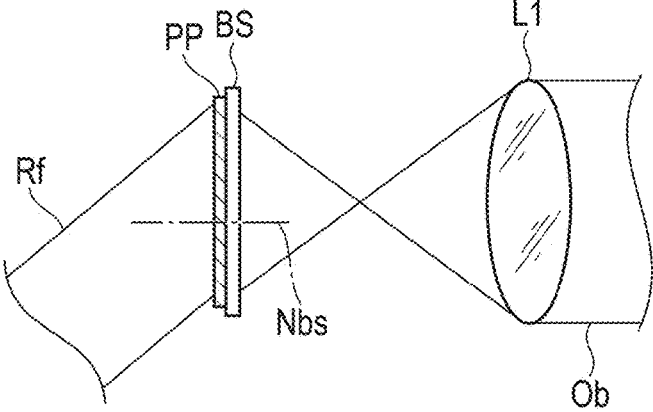
FIG. 16 is a diagram for explaining another example of the manufacturing method of the holographic optical element HE.

FIG. 16 is a diagram for explaining another example of the manufacturing method of the holographic optical element HE.

The manufacturing method illustrated in FIG. 16 is different from the manufacturing method illustrated in in FIG. 15 in that reference light Rf is parallel light and is radiated toward the photosensitive resin PP not via a lens. Reference light Rf and object light Ob are light of the same wavelength and interfere at the position of the photosensitive resin PP.

Interference fringes of reference light Rf and object light Ob are recorded in the photosensitive resin PP. In this way, the holographic optical element HE having a lens action equivalent to that of a concave mirror for incident light (parallel light) in a direction inclined with respect to the normal Nbs is manufactured. The holographic optical element HE thus manufactured is applicable as, for example, the holographic optical element HE of the display device DSP illustrated in FIG. 8, etc.

As described above, according to the present embodiment, a display device which can be downsized can be provided.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display element comprising a display portion which displays an image;
a first retardation film overlapping the display element;
a holographic optical element adjacent to the display element and not overlapping the display portion;
a second retardation film having a first surface and a second surface on an opposite side to the first surface, the first surface facing the first retardation film and the holographic optical element and directly contacting neither a main surface of the first retardation film nor a main surface of the holographic optical element; and
a reflective polarizer disposed on the second surface, wherein
the first surface faces the first retardation film and the holographic optical element with an air layer interposed between the first surface and the first retardation film and between the first surface and the holographic optical element.

2. The display device of claim 1, wherein
the display element is configured to emit display light of linearly polarized light,
the first retardation film and the second retardation film are quarter-wave plates, and
the reflective polarizer is configured to reflect first linearly polarized light and to transmit second linearly polarized light different from the first linearly polarized light.

3. The display device of claim 1, wherein
the holographic optical element has a lens action and is configured to reflect light reflected by the reflective polarizer toward the reflective polarizer.

4. The display device of claim 3, further comprising a light blocking member disposed on a back surface side of the holographic optical element.

5. The display device of claim 3, wherein
the holographic optical element is configured to transmit ambient light.

6. The display device of claim 1, wherein
the display element comprises an illumination device, a liquid crystal panel disposed between the illumination device and the first retardation film, a first polarizer disposed between the illumination device and the liquid crystal panel, and a second polarizer disposed between the liquid crystal panel and the first retardation film.

7. The display device of claim 6, wherein
the illumination device comprises a light guide and a light source facing a side surface of the light guide, and
the liquid crystal panel is located between the light source and the holographic optical element in a direction in which the display element and the holographic optical element are arranged.

8. The display device of claim 1, wherein
the first retardation film, the second retardation film, and the holographic optical element are covered with anti-reflective layers.

9. The display device of claim 1, wherein
a width of the display portion is equal to a width of the holographic optical element in a direction in which the display element and the holographic optical element are arranged.

10. The display device of claim 1, wherein
a normal of the holographic optical element is parallel to a normal of the reflective polarizer, and
a normal of the display element is inclined with respect to the normal of the reflective polarizer.

* * * * *